United States Patent [19] [11] 4,194,757
Lucas et al. [45] Mar. 25, 1980

[54] ADJUSTABLE LIFT LINK FOR A THREE-POINT HITCH

[75] Inventors: James H. Lucas; David A. Berg, both of Milwaukee, Wis.

[73] Assignee: Allis-Chalmers Corporation, Milwaukee, Wis.

[21] Appl. No.: 951,392

[22] Filed: Oct. 16, 1978

[51] Int. Cl.² ............................................. B60D 1/14
[52] U.S. Cl. ........................ 280/461 A; 254/DIG. 3; 280/490 A; 403/46
[58] Field of Search .......... 280/456 A, 456 R, 461 A, 280/461 R, 460 A, 490 A; 403/46, 118; 254/98, DIG. 3; 74/491; 248/354 S, 354 R, 356

[56] References Cited
U.S. PATENT DOCUMENTS

| 2,920,500 | 1/1960 | Edman | 74/491 |
| 3,371,945 | 3/1968 | Adams et al. | 280/461 A |
| 3,471,185 | 10/1969 | Parr | 403/118 |
| 3,825,283 | 7/1974 | Hansen | 280/461 A |
| 3,851,978 | 12/1974 | Kuipers | 403/46 |

Primary Examiner—Joseph F. Peters, Jr.
Assistant Examiner—Donn McGiehan
Attorney, Agent, or Firm—Arthur L. Nelson

[57] ABSTRACT

An adjustable lift link on a three-point hitch having a self-locking handle and retainer for selectively adjusting and holding the adjustment of the lift link. A stop on the link selectively provides the float or fixed length positions of the link of the three-point hitch.

10 Claims, 5 Drawing Figures

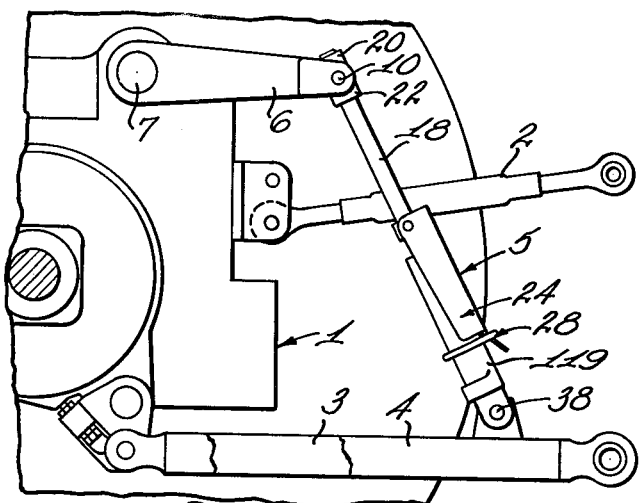
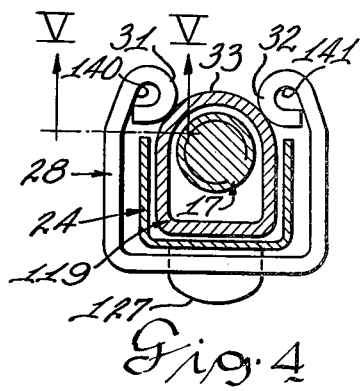
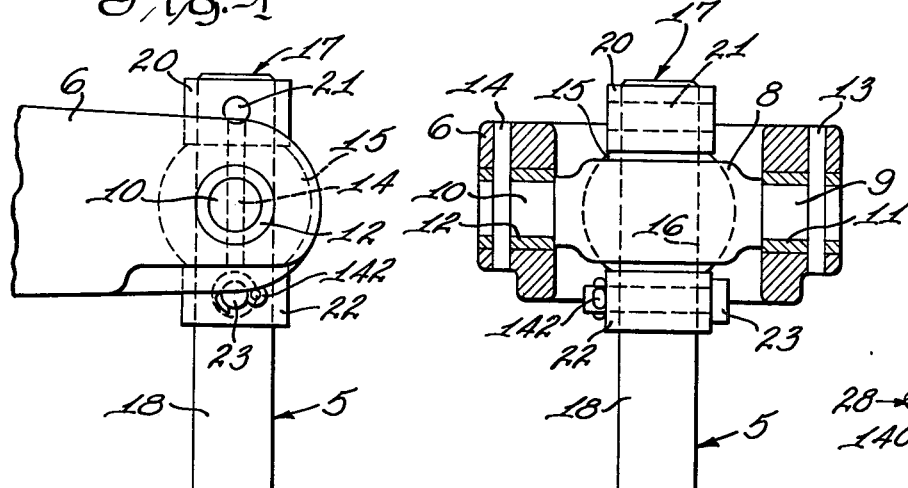
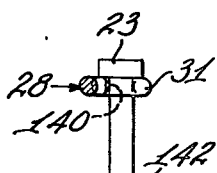
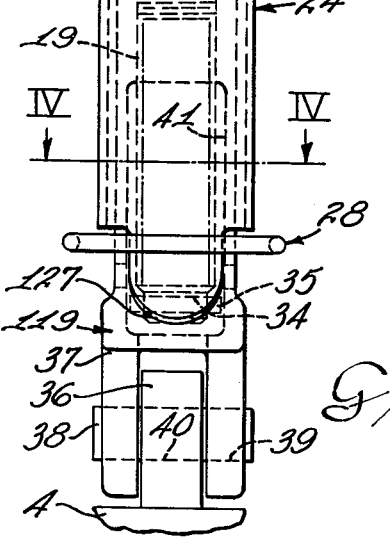

ADJUSTABLE LIFT LINK FOR A THREE-POINT HITCH

This invention relates to a three-point hitch, and more particularly to an adjustable lift link on a three-point hitch having a handle extending radially for adjusting and pivoting downward to lock the link with a retainer to hold the handle in the lock position to prevent rattling and losing the adjustment of the lift link. The link selectively provides a fixed length or a free-floating link for operation of the three-point hitch.

A three-point hitch used as a coupling between the implement and tractor generally includes a pair of lower draft arms universally mounted on their forward end where the arms are connected to the tractor chassis. An upper link is connected between the tractor chassis and the implement which can be adjustably extended or contracted to provide a leveling control on the implement. A pair of rock arms on a rock shaft which can be hydraulically operated to raise and lower the rock arms carries two lift links pivotally connected between the rock arms and the lower draft arms. The lower draft arms and the upper link are universally connected on the forward ends to accommodate sway, lift and lowering of the three-point hitch through hydraulic means. The two lower drafts and the upper link are connected through complementary connections to the implement to provide a coupling between the tractor and the implement.

Accordingly, this invention provides a lift link between each of the rock arms and its mating lower draft arm for selectively raising and lowering of the draft arms prior to operation of the implement. The lift link has a screw adustment with a screw threadedly received in a sleeve connected to the lower draft arm. A trunnion mount on a rock arm carries a spherical bearing for a universal movement of the upper end of the lift link. Axial movement of the link is permitted by release of a stop to allow the three-point hitch to operate in a float condition or in a fixed length condition when the stop is engaged. The screw adjustment is provided by an upper screw member of the lift link threadedly engaging a sleeve forming a clevis connected to the lower draft arm. A handle is pivotally connected to the upper screw member of the lift link which can pivot radially to provide adjustment of the lift link. The outersurface of the sleeve of the clevis has a square configuration which is received within a U-shaped handle when the handle is pivoted to the axially downward position to thereby lock the adjusting screw in its adjusted position. To retain the link in its adjusted position a retainer slides axially downward which seats against the outside of the sleeve and the handle to retain the handle in the locked position when the three-point hitch is in operation. Links provide universal and axial movement of the lift link relative to the rock arms in the float position or universal movement only with a stop preventing axial movement in the fixed link operation of the lift link.

The preferred embodiment of this invention is illustrated in the attached drawings.

FIG. 1 illustrates a side-elevation view of a three-point hitch on a tractor;

FIG. 2 illustrates a rear-elevation view of the link with a portion of the rock arm and the lower draft arm connected to the link.

FIG. 3 is a side-elevation view of the lift link showing a portion of the rock arm and the lower draft arm connected thereto.

FIG. 4 is a cross-section view taken on line IV—IV of FIG. 2.

FIG. 5 is a cross-section view taken on line V—V of FIG. 4.

The tractor 1 pivotally supports the upper link 2 which extends rearwardly for connection to implement. Each of the lower draft arms 3 and 4 are pivotally connected to a lift link 5. Each lift link 5 is universally connected to a rock arm 6. The rock arms 6 are supported on the rock shaft 7 and pivoted by hydraulic means to lift and lower the three-point hitch.

The lift link 5 is shown in FIGS. 2 and 3. The rock arm 6 is connected to the link 5 through the trunnion 8 formed by the shafts 9 and 10. The shaft 9 is mounted in the bushing 11 while the shaft 10 is mounted in the bushing 12. The retaining pins 13 and 14 retain the bushings 11 and 12, respectively, in a non-rotating position.

The trunnion 8 receives a spherical bushing 15 which is formed with a central opening 16 to receive the screw 17. The screw 17 is formed by a shank 18 having a threaded end 19 for threadedly engaging a sleeve member or square cast clevis 119. The collar 20 embraces the upper end of the screw 17 to form a head and is fastened by the pin 21 which extends diametrically through the collar and screw.

Normally the lift link operates as a fixed length link due to the collar 22 which forms a stop against trunnion 8. The pin 23 is movably mounted in a manner to extend diametrically through the collar 22 and the shank 18 to normally fix the length of the link 5. Removal of pin 23 allows the collar 22 to drop to a rest position on the collar 26. This allows the trunnion 8 to move on the shank 18 of the link placing the three-point hitch in float operation.

The handle 24 is pivotally mounted on the pin 25 which extends through a collar 26 and the shank 18 of screw 17. The handle 24 is a three-sided member which folds downwardly around the square sided portion of the square cast clevis 119 locking the clevis in its adjusted position. The handle 24 is fitted with a cut away slot 27 to receive the shank 18 of screw 17. As the handle is pivoted radially from the shank 18 in the normal operating position for adjusting the screw 17. The handle 24 is shown in the folded down position in which the three-sided handle is locking the square cast clevis 119. The handle 24 is formed with a spring seat 127 which extends diagonally from the link 5 and supports the keeper spring 28. The keeper spring 28 slides downwardly as it engages the inclined surface 29 of the spring seat 127 and presses firmly on the opposite side 33 of the clevis 119. This position is shown in FIG. 4 in which the curled ends 31 and 32 bear against the cylindrical portion 33 of the clevis 119. In this position, the keeper spring 28 prevents any rattling of the handle 24 and any vibration or looseness which may be caused due to wear and also assure that the adjustment between the screw 17 and the clevis 119 will not change.

The shape of the handle 24 is formed of a sheet metal stamping such that the spring seat 127 is cut from the subsequent stamping slot 27 to avoid any scrap in manufacturing.

The collar 22 is fastened by the pin 23 when the link is in the fixed length position. When it is desirable to operate the three-point hitch with a float condition the pin 23 is removed and the collar 22 lowers onto the collar 26. This allows the shank 18 of screw 17 to reciprocate in the bearing 15. The lower draft arms are free to "float" up and down through a limited range under these conditions. The pin 23 is placed in an opening 140 or 141 in the curled ends of the spring 28. Accordingly, the pin is available to reinsert in the collar 22 when the three-point hitch is operated with a fixed length of the link 5.

The lower end of the screw 17 is formed with a cross passage 34 which receives a pin 35 to prevent overextending of the link. The link can be extended so the pin engages the center portion of the clevis and contracted until it engages the bifurcated portion which limits the range of the link extension and contraction.

The lower draft arm 4 forms an integral lug 36 received in the bifurcated portion 37 of the clevis 19. A pin 38 extends through the openings 39 and 40 to connect the lift link 5 to the lower draft arm 4.

FIG. 5 shows the storage position of pin 23 in opening 140 and having a cotter key 142. Opening 141 may also be used for storage of pin when the three-point hitch is in the float condition.

The operation of the device will be described in the following paragraphs.

A lift link 5 normally controls raising and lowering of each of the lower draft arms 3 and 4 when the hydraulic weight distribution system lifts and lowers the implement. A link adjustment is made to present the draft arms relative to the rock arms 6 and accordingly the link adjustment shown provides this adjustment. The adjustment is mechanical by rotating the screw 17 by the use of the handle 24. The handle 24 is extended radially to form a lever for rotating the screw 17 to either lengthen or contract the lift link as desired. When the desired length is provided, the handle 24 folds down in the position as shown in FIGS. 2 and 3. The keeper spring 28 then is slid downwardly onto the spring seat 127 producing a slight tension as it bears against the inclined surface 29 to keep the handle firmly seated on the square cast clevis 119.

The embodiments of the invention in which an exclusive property or privilege is claimed are defined as follows:

1. A three-point hitch having an adjustable link comprising, a coupling adapted for mounting on a rock arm defining a spherical bearing, a lift link including a spherical bushing received in said bearing permitting universal pivotal movement of said link relative to said coupling, a screw member defining a cylindrical shank extending downwardly from said spherical bearing and bushing and defining a threaded end, a sleeve member having a square external surface and defining a threaded inner periphery receiving said threaded end of said screw member, a handle pivotally mounted for pivotal movement from a radial to an axial position on said screw member, said handle defining a square internal configuration for being received on said square sleeve member for locking said link axially, a keeper spring for retaining said handle in the locked position on said sleeve member.

2. A three-point hitch having an adjustable link as set forth in claim 1 wherein said bushing defines a cylindrical opening for receiving the shank of said screw member, a stop replaceably fastened on said screw member to fix said coupling on said screw member when said stop is fastened and permit said coupling to move axially relative to said screw member when said stop is released.

3. A three-point hitch having an adjustable link as set forth in claim 1 wherein said keeper spring defines a spring embracing said handle and said sleeve member.

4. A three-point hitch having an adjustable link as set forth in claim 1 wherein said sleeve member defines a clevis adapted for pivotal connection with a lower draft arm of the three-point hitch.

5. A three-point hitch having an adjustable link as set forth in claim 1 wherein said handle defines a notched portion for fitting on said screw member when said handle is pivoted to the radial operating position for adjusting said screw member of said lift link.

6. A three-point hitch having an adjustable link as set forth in claim 1 wherein said sleeve member defines a square cast clevis, said handle defines a U-shaped cross section for mating the square cast clevis for locking said handle and screw member relative to said sleeve member in the folded down axial position.

7. A three-point hitch having an adjustable link as set forth in claim 1 wherein said handle defines a slot for receiving the shank of said screw in the radial position.

8. A three-point hitch having an adjustable link as set forth in claim 1 wherein said sleeve member defines a clevis adapted for pivotally connecting to a lower draft arm.

9. A three-point hitch having an adjustable link as set forth in claim 1 wherein said screw defines a cylindrical shank slideably extending through said bushing, a collar removeably fastened by a pin on said shank, said keeper spring defines an opening for receiving said pin when said pin is removed from said collar and said hitch is in the float position.

10. A three-point hitch having an adjustable link as set forth in claim 1 wherein said screw member defines a head engaging the upper side of said coupling, said coupling defines a cylindrical opening for receiving the shank of said screw member, a stop mounted on said shank of said screw member for preventing axial movement of said shank of said screw member when said stop is fastened to said screw member and permitting axial movement for a floating condition of said three-point hitch when said stop is released from said shank of said screw member.

* * * * *